(12) United States Patent
Okuda

(10) Patent No.: US 7,715,388 B2
(45) Date of Patent: May 11, 2010

(54) MULTICAST SYSTEM, COMMUNICATION APPARATUS, AND MULTICAST METHOD FOR CONNECTION SETUP BEFORE MULTICASTING

(75) Inventor: Masato Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 744 days.

(21) Appl. No.: 11/471,301

(22) Filed: Jun. 20, 2006

(65) Prior Publication Data

US 2007/0217416 A1    Sep. 20, 2007

(30) Foreign Application Priority Data

Mar. 16, 2006    (JP) .............................. 2006-072902

(51) Int. Cl.
*H04L 12/56*    (2006.01)
(52) U.S. Cl. .................. 370/390; 370/395.2; 370/401
(58) Field of Classification Search .......... 370/254, 370/255, 389, 390, 392, 395.2, 392.21, 395.3, 370/395.31, 401
See application file for complete search history.

(56) References Cited

U.S. PATENT DOCUMENTS

| | | | | |
|---|---|---|---|---|
| 6,556,544 | B1 * | 4/2003 | Lee ........................... | 370/256 |
| 6,563,794 | B1 * | 5/2003 | Takashima et al. .......... | 370/236 |
| 6,728,777 | B1 * | 4/2004 | Lee et al. ..................... | 709/238 |
| 7,161,958 | B2 * | 1/2007 | Aramaki ..................... | 370/470 |
| 7,400,601 | B2 * | 7/2008 | Moritani et al. ............. | 370/331 |
| 2002/0114351 | A1 | 8/2002 | Aramaki | |
| 2004/0258066 | A1 * | 12/2004 | Chen et al. .................. | 370/390 |
| 2006/0034281 | A1 * | 2/2006 | Cain et al. ................... | 370/390 |
| 2006/0221861 | A1 * | 10/2006 | Previdi et al. ............... | 370/254 |

FOREIGN PATENT DOCUMENTS

| | | |
|---|---|---|
| JP | 2002-9767 | 1/2002 |
| JP | 2004-343243 | 12/2004 |

\* cited by examiner

*Primary Examiner*—Hong Cho
(74) *Attorney, Agent, or Firm*—Katten Muchin Rosenman LLP

(57) ABSTRACT

A message-type determining unit determines whether an IGMP message received from a user terminal is a join message. A table controlling unit determines that a connection needs to be established when receiving a join message from a user terminal. The table controlling unit determines that a connection needs to be removed when all the user terminals have left a multicast group. A CID obtaining unit obtains the CID of a connection to be established or removed. A C control-message generating unit generates a C control message to request connection establishment or connection removal. A C control-message transmitting unit sends the C control message to an OLT.

12 Claims, 14 Drawing Sheets

FIG.3A

| MULTICAST GROUPS (IP ADDRESS) | USER TERMINAL #1 | USER TERMINAL #2 | USER TERMINAL #3 |
|---|---|---|---|
| A | S |   | S |
| B |   | S |   |
| C |   |   |   |

FIG.3B

| MULTICAST GROUPS (IP ADDRESS) | CONNECTION ID (CID) |
|---|---|
| A | a123 |
| B | b456 |
| C | c789 |

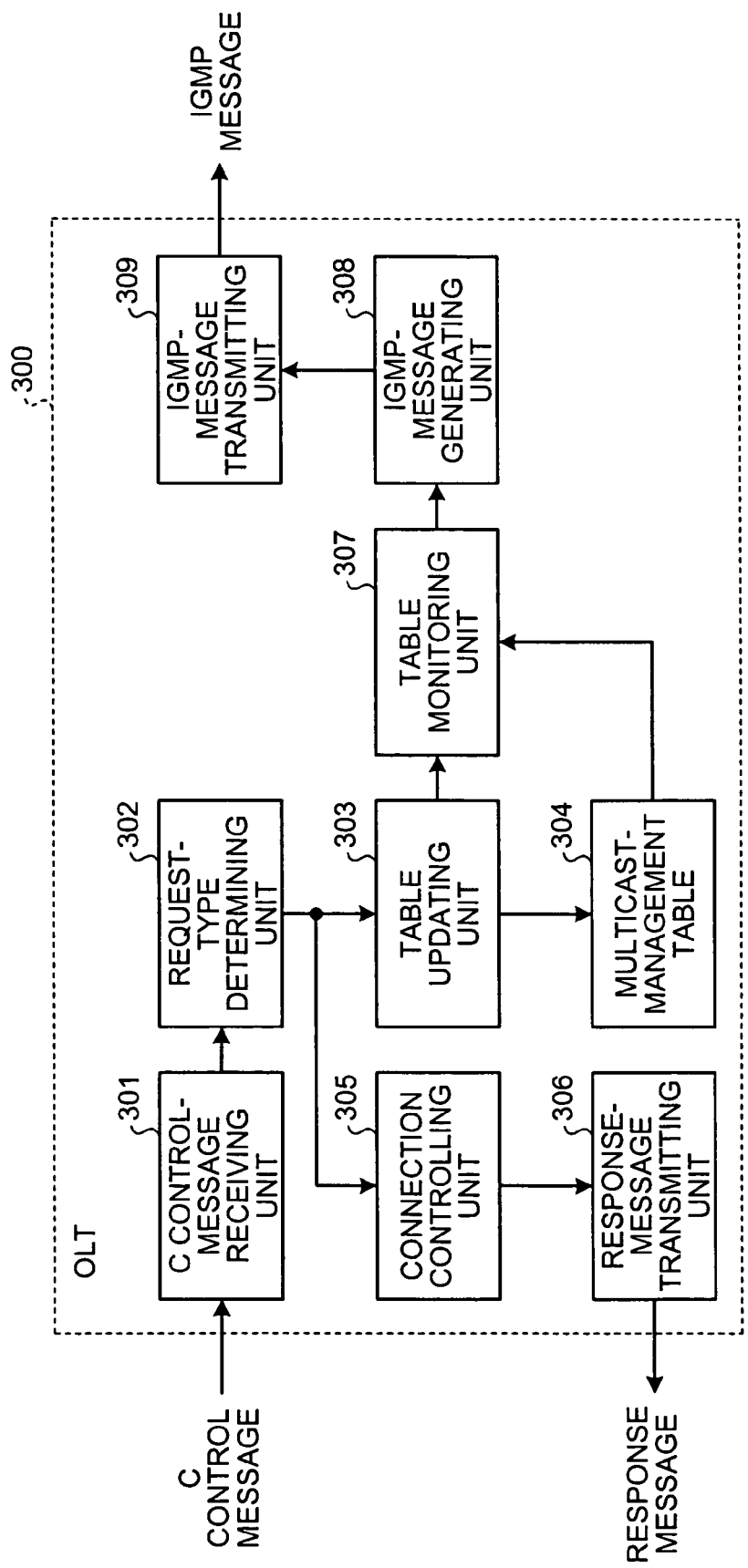

FIG.5

| MULTICAST GROUPS (IP ADDRESS) | CONNECTION ID (CID) | ONU #1 | ONU #2 | ONU #3 |
|---|---|---|---|---|
| A | a123 | S | | S |
| B | b456 | | S | |
| C | c789 | | S | S |

MULTICAST SYSTEM, COMMUNICATION APPARATUS, AND MULTICAST METHOD FOR CONNECTION SETUP BEFORE MULTICASTING

BACKGROUND OF THE INVENTION

1. Field of the Invention

The present invention relates to a multicast system, a communication apparatus, and a multicast method enabling a communication system that requires connection setup before multicasting to effectively utilize communications media, thus improving services.

2. Description of the Related Art

Internet protocols (IP) standardized by the Internet Engineering Task Force (IETF) have been widely used for recent communications. Examples of communications using IP include point-to-point communication and multicast communication. Multicast is a technology that enables the same data to be delivered simultaneously to a plurality of user terminals. In multicast, a user terminal informs an upstream network node of its desire to join or leave a certain multicast group. Upon receiving such a join or leave request for a multicast group from a user terminal, the upstream network node controls the delivery of multicast data to that user terminal.

The user terminal sends the join or leave request to the upstream network node by using a protocol, such as Internet Group Management Protocol (IGMP) or Multicast Listener Discovery (MLD). IGMP includes IGMPv1 and IGMPv2. In addition to the abilities of the IGMPv1, the IGMPv2 enables a leave request to be quickly sent to the upstream network node.

Besides, due to needs for broadbandization and availability of telecommunications infrastructure, various broadband technologies, such as wireless and passive optical networks (PON), have been increasingly used. In the PON's, light transmitted along an optical fiber is split by an optical coupler into a plurality of paths. The PON allows multiple user terminals to share the same optical fiber, while wireless technology allows multiple user terminals to share the same radio frequency. That is, with such technologies, communications media is shared by a plurality of user terminals, and therefore, communication data is relatively easily eavesdropped by a third party. For this reason, in the PON and the wireless technologies, a connection is established on media between nodes that communicate with each other, and data is logically sorted and managed according to the established connection.

In the PON and the wireless communication systems that require connection setup before multicasting, it is essential that a multicast control protocol, such as the IGMP and the MLD, which supports the network layer (Layer 3) of the OSI model be compatible with connection control in the data link layer (Layer 2) of the OSI model.

A conventional technique for multicast in the PON is disclosed in, for example, Japanese Patent Laid-Open No. 2004-343243. According to the technique, a station-side communication equipment: an optical line terminal (OLT), snoops an IGMP message (a join or leave request, etc.) sent from a user terminal, and performs signaling for connection control depending on the content of the message.

The conventional technique, however, has a disadvantage that media, such as an optical fiber and radio frequency, is consumed by signaling. A multicast-control message and a connection-control message are both control information that does not contain data to be provided to a user. In spite of this, the transmission of such control information through shared communications media causes the pressure on bandwidth for other users, thus reducing the quality of service.

Especially, in broadcast services, which are major services that use multicast, channel switching (zapping) involves the frequent transmission of both multicast-control messages and connection-control messages. The control messages result in the considerable waste of bandwidth. In addition, a plurality of control messages transmitted by one channel switching leads to a control delay.

SUMMARY OF THE INVENTION

It is an object of the present invention to at least partially solve the problems in the conventional technology.

According to an aspect of the present invention, a multicast system includes a plurality of terminal units; a first communication apparatus that sends a request for transmission of multicast data to a second communication apparatus and delivers multicast data to at least one of the terminal units upon receiving the multicast data from the second communication apparatus; and the second communication apparatus that establishes a connection with the first communication apparatus upon receiving a request from the first communication apparatus and transmits requested multicast data to the first communication apparatus through the connection. The first communication apparatus includes a first multicast-control message receiving unit that receives a first multicast-control message from a terminal unit among the terminal units requesting delivery of multicast data; a determining unit that determines whether a connection needs to be established for multicast data specified by received first multicast-control message based on the first multicast-control message; and a connection-control message transmitting unit that transmits, according to the determination by the determining unit, a connection-control message to request connection establishment when a connection is required, and a connection-control message to request connection removal when a connection is not required. The second communication apparatus includes a connection-control-message receiving unit that receives a connection-control message from the first communication apparatus; a connection controlling unit that controls a connection to the first communication apparatus according to received connection-control message; and a storage unit that stores therein a connection established by the connection controlling unit in association with corresponding multicast data.

According to another aspect of the present invention, a communication apparatus that requests an upstream node to transmit multicast data through a connection, and delivers the multicast data to a terminal unit includes a multicast-control message receiving unit that receives a multicast-control message concerning the delivery of multicast data; a determining unit that determines whether a connection needs to be established for multicast data specified by the received multicast-control message based on the multicast-control message; and a connection-control message transmitting unit that transmits to the upstream node, according to the determination by the determining unit, a connection-control message to request connection establishment when a connection is required, and a connection-control message to request connection removal when a connection is not required.

According to still another aspect of the present invention, a communication apparatus that establishes a connection to a communication partner to transmit multicast data through the connection includes a connection-control-message receiving unit that receives a connection-control message sent from the communication partner; a connection controlling unit that controls a connection to the communication partner according to the received connection-control message; and a storage unit that stores therein a connection established by the connection controlling unit in association with corresponding multicast data.

According to still another aspect of the present invention, a multicast method applied to a multicast system that includes a terminal unit, a first communication apparatus that sends a request for transmission of multicast data to a second communication apparatus and delivers multicast data to the terminal unit upon receiving the multicast data from the second communication apparatus, and the second communication apparatus that establishes a connection with the first communication apparatus upon receiving a request from the first communication apparatus and transmits requested multicast data to the first communication apparatus through the connection. The multicast method includes the first communication apparatus receiving a multicast-control message from the terminal unit requesting delivery of multicast data; determining whether a connection needs to be established for multicast data specified by received multicast-control message based on the multicast-control message; and transmitting, according to the determination at the determining, a connection-control message to request connection establishment when a connection is required, and a connection-control message to request connection removal when a connection is not required. The multicast method includes the second communication apparatus receiving a connection-control message from the first communication apparatus; controlling a connection to the first communication apparatus according to the received connection-control message; and storing a connection established at the controlling in association with corresponding multicast data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A is an example of the contents of a subscriber-information table shown in FIG. 2;

FIG. 3B is an example of the contents of a CID table shown in FIG. 2;

FIG. 4 is a detailed block diagram of an OLT shown in FIG. 1;

FIG. 5 is an example of the contents of a multicast-management table shown in FIG. 4;

DETAILED DESCRIPTION OF THE PREFERRED EMBODIMENTS

Exemplary embodiments of the present invention are explained below in detail with reference to the accompanying drawings.

Incidentally, in the following description, the PON is used as an example for communication that requires connection control. However, the present invention can be applied to other communication, such as wireless communication, which supports multicast. Besides, while the IGMP is used as a multicast control protocol, the IGMP is given by way of example and without limitation.

Figure 1:
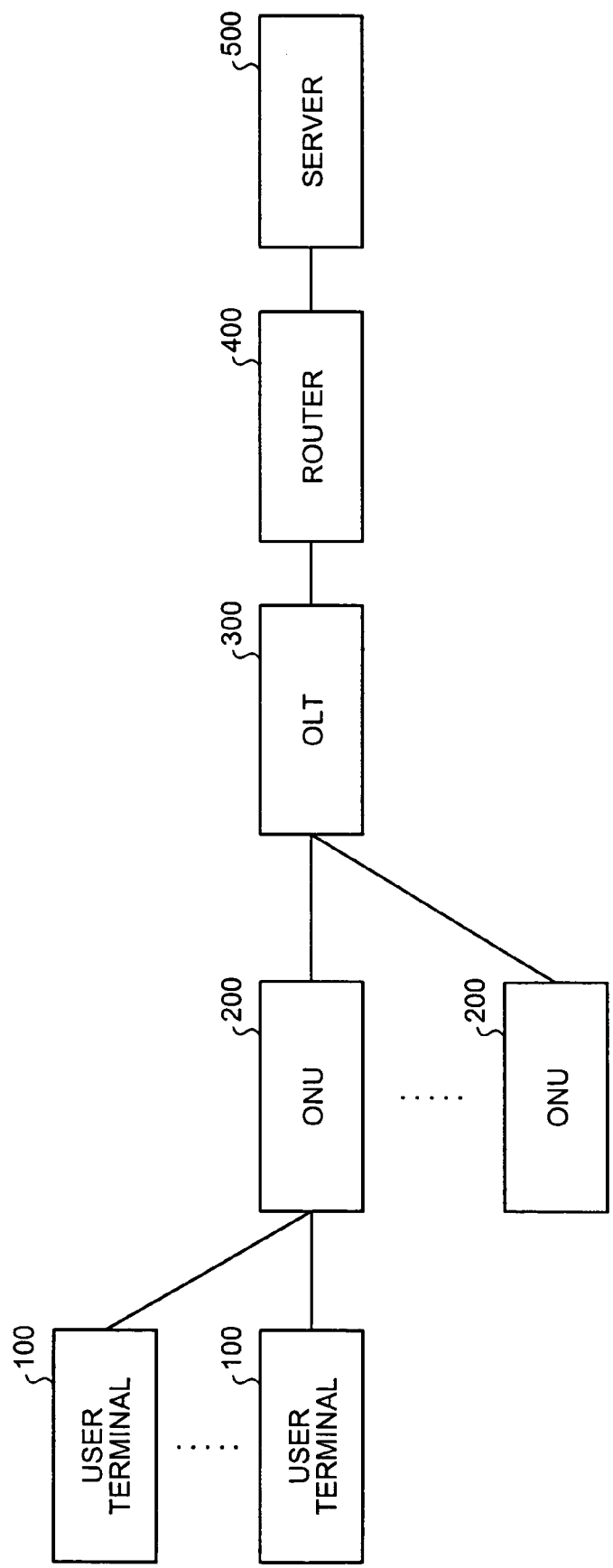
FIG. 1 is a schematic of a multicast system according to a first embodiment of the present invention.

FIG. 1 is a schematic of a multicast system according to a first embodiment of the present invention. The multicast system includes a plurality of user terminals 100, a plurality of optical network units (ONU's) 200, an optical line terminal (OLT) 300, a router 400, and a server 500.

To initiate receiving desired multicast data, the user terminal 100 sends the ONU 200 a join message for a multicast group corresponding to the desired multicast data. When terminating the receipt of the multicast data, the user terminal 100 sends the ONU 200 a leave message for the multicast group.

Having received an Internet group management protocol (IGMP) message, such as a join or leave message, from the user terminal 100, the ONU 200 sends the OLT 300 a connection-control message (hereinafter, "C control message"). The C control message is sent to the OLT 300 depending on the number of participants in a multicast group from all the downstream user terminals 100, and requests a connection to or disconnection from the multicast group.

Having received a C control message from the ONU 200, the OLT 300 establishes or removes a connection to the ONU 200 according to the content of the C control message. In consideration of the state of multicast distribution to all the downstream ONU's 200, the OLT 300 sends the router 400 an IGMP message, such as a join or leave message for a multicast group.

Having received an IGMP message from the OLT 300, the router 400 forwards the received IGMP message to the server 500. Besides, the router 400 forwards multicast data received from the server 500 to the OLT 300. The server 500 receives an IGMP message from the router 400. The server 500 sends multicast data for a multicast group to the router 400 connected to the user terminal 100 that subscribes to the multicast group.

Figure 2:
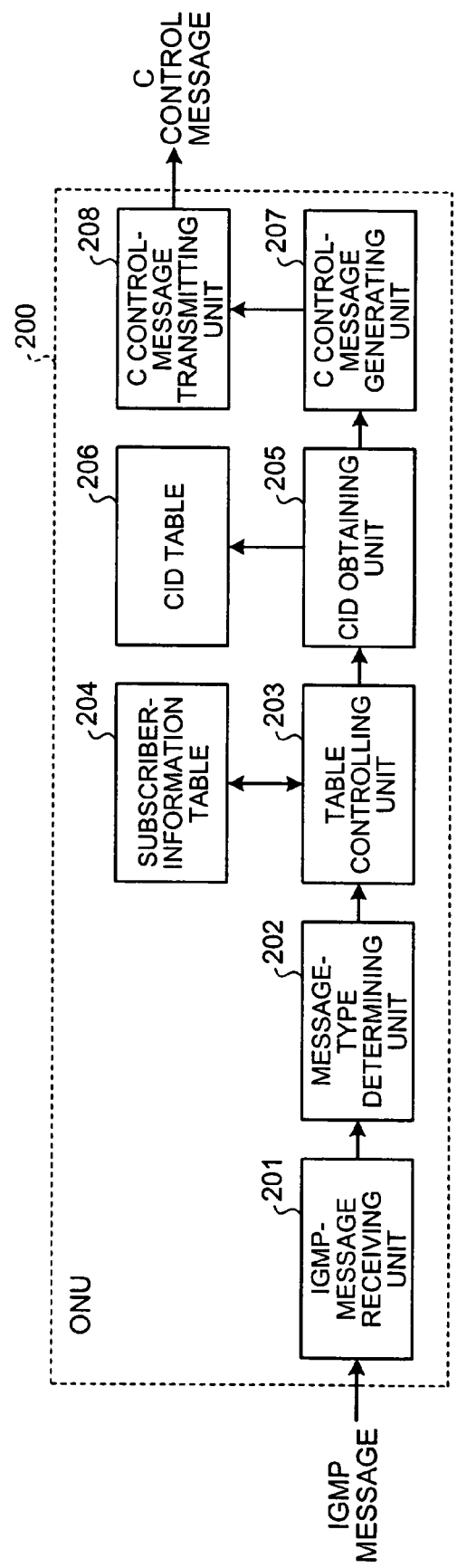
FIG. 2 is a detailed block diagram of an ONU shown in FIG. 1.

FIG. 2 is a detailed block diagram of the ONU 200. The ONU 200 includes an IGMP-message receiving unit 201, a message-type determining unit 202, a table controlling unit 203, a subscriber-information table 204, a connection ID (hereinafter, "CID") obtaining unit 205, a CID table 206, a C control-message generating unit 207, and a C control-message transmitting unit 208.

The IGMP-message receiving unit 201 receives an IGMP message from the downstream user terminal 100, which requests participation in or withdrawal from a multicast group. On receipt of the IGMP message from the IGMP-message receiving unit 201, the message-type determining unit 202 determines whether the IGMP message is intended to join or leave a multicast group, i.e., whether the message is a join message or leave message. The message-type determining unit 202 informs the table controlling unit 203 of the result of the determination.

On receiving the determination result from the message-type determining unit 202, the table controlling unit 203 reflects the determination result in the subscriber-information table 204, and manages participation in respective multicast groups from all the downstream user terminals 100. On receipt of a join message for a new multicast group from the downstream user terminal 100, the table controlling unit 203 determines that it is necessary to establish a connection to the multicast group and informs the CID obtaining unit 205 that a connection is required. On the other hand, when there is no participant in a multicast group from all the downstream user terminals 100, the table controlling unit 203 determines that it is necessary to remove a connection to the multicast group. The table controlling unit 203 informs the CID obtaining unit 205 that a disconnection is required.

FIG. 3A is an example of the contents of the subscriber-information table 204. The subscriber-information table 204 contains information on participation in multicast groups from the respective downstream user terminals 100. In the example of FIG. 3A, user terminals #1 and #3 subscribe to a multicast group A, and a user terminal #2 subscribes to a multicast group B. There is no participant in a multicast group C. Incidentally, the letter S in the subscriber-information table 204 stands for subscription. The subscriber-information table 204 is updated by the table controlling unit 203 when the IGMP-message receiving unit 201 receives an IGMP message from the user terminal 100.

According to the information from the table controlling unit 203, the CID obtaining unit 205 obtains from the CID table 206 the CID of a connection to be established or removed. The CID obtaining unit 205 informs the C control-message generating unit 207 that the connection with the obtained CID is to be established or removed. FIG. 3B is an example of the contents of the CID table 206. The CID table contains CIDs each corresponding to a multicast group. In FIG. 3B, each of the multicast groups A to C is associated with a CID that uniquely identifies a corresponding connection.

According to the information from the CID obtaining unit 205, the C control-message generating unit 207 generates a C control message. The C control message includes a connection-request message to establish a connection and a disconnection-request message to remove a connection. The C control-message generating unit 207 adds the CID of a connection to be established or removed to the C control message. The C control-message transmitting unit 208 sends the C control message generated by the C control-message generating unit 207 to the OLT 300.

FIG. 4 is a detailed block diagram of the OLT 300. The OLT 300 includes a C control-message receiving unit 301, a request-type determining unit 302, a table updating unit 303, a multicast-management table 304, a connection controlling unit 305, a response-message transmitting unit 306, a table monitoring unit 307, an IGMP-message generating unit 308, and an IGMP-message transmitting unit 309.

The C control-message receiving unit 301 receives a C control message from the downstream ONU 200, which requests to establish or remove a specific connection. On receipt of the C control message from the C control-message receiving unit 301, the request-type determining unit 302 determines whether the C control message is a connection-request message or a disconnection-request message. The request-type determining unit 302 informs the table updating unit 303 and the connection controlling unit 305 of the result of the determination.

When informed of the determination result by the request-type determining unit 302, the table updating unit 303 reflects the determination result in the multicast-management table 304. The table updating unit 303 informs the table monitoring unit 307 that the multicast-management table 304 has been updated.

FIG. 5 is an example of the contents of the multicast-management table 304. The multicast-management table 304 stores therein information on the necessity and unnecessity of transferring multicast data for respective multicast groups. Incidentally, in FIG. 5, the letter S stands for subscription. That is, for example, ONU's #1 and #3 are connected to the user terminal 100 that subscribes to the multicast group A, and multicast data for the multicast group A needs to be transferred to the ONU's #1 and #3, but not to an ONU #2.

When informed of the determination result by the request-type determining unit 302, the connection controlling unit 305 establishes or removes a connection to the ONU 200. More specifically, when the received C control message is a connection-request message, the connection controlling unit 305 establishes a connection corresponding to a CID contained in the C control message. When the received C control message is a disconnection-request message, the connection controlling unit 305 removes a connection corresponding to a CID contained in the C control message.

On completion of the connection control in response to the C control message, which can be a connection-request message or a disconnection-request message, the response-message transmitting unit 306 sends the sender ONU 200 a response message informing that the connection control has been completed.

The table monitoring unit 307 monitors the multicast-management table 304. When informed by the table updating unit 303 that the multicast-management table 304 has been updated, the table monitoring unit 307 determines whether the updating is caused by new participation in or withdrawal from a multicast group. In other words, when the downstream ONU 200 requests a connection to a new multicast group, the table monitoring unit 307 determines that there is participation in the multicast group. On the other hand, when all the downstream ONU's 200 do not require anymore a connection to a multicast group, the table monitoring unit 307 determines that there is withdrawal from the multicast group. Accordingly, the table monitoring unit 307 informs the IGMP-message generating unit 308 of the result of the determination.

According to the information from the table monitoring unit 307, the IGMP-message generating unit 308 generates an IGMP message, such as a join or leave message for a multicast group. The IGMP-message transmitting unit 309 sends the IGMP message generated by the IGMP-message generating unit 308 to the router 400.

Figure 6:
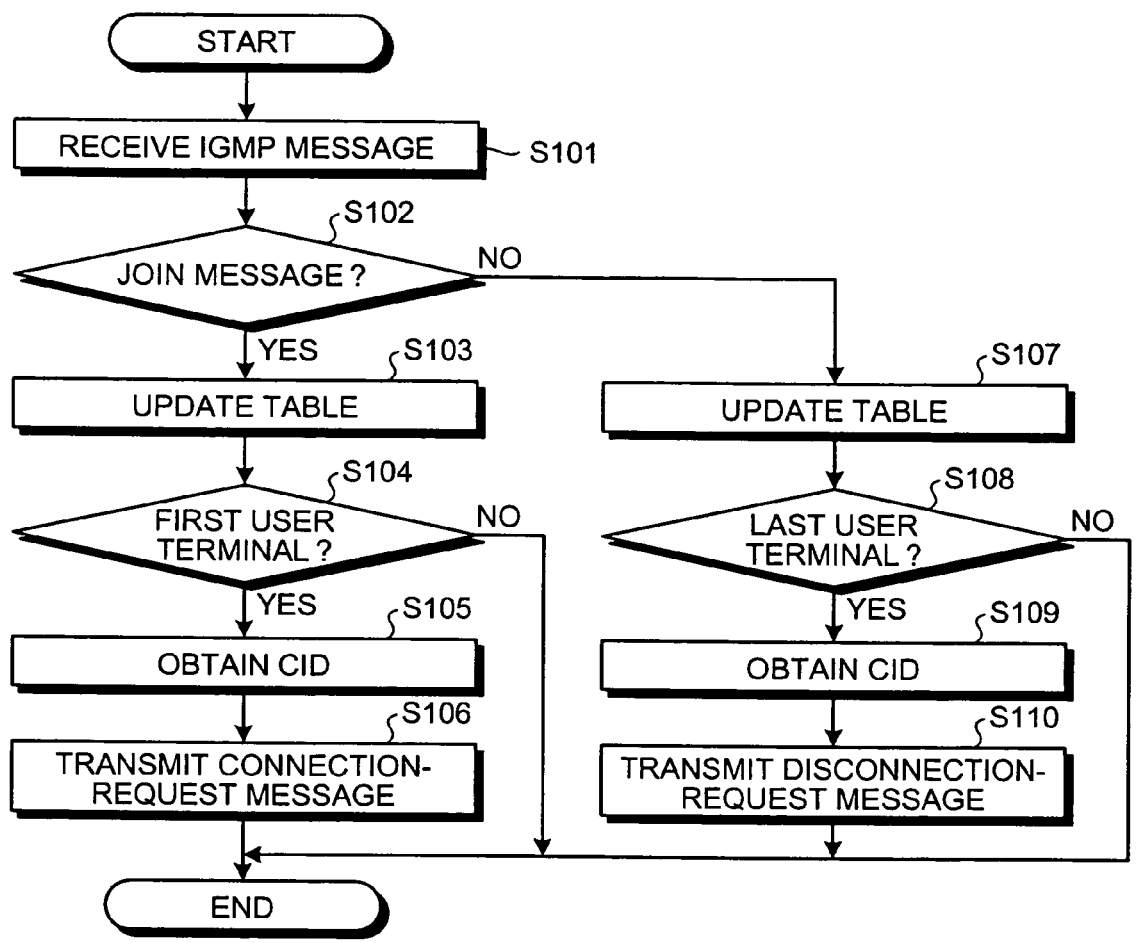
FIG. 6 is a flowchart of the operation of the ONU shown in FIG. 2.

FIG. 6 is a flowchart of the operation of the ONU 200. First, the IGMP-message receiving unit 201 receives an IGMP message from the user terminal 100 (step S101). The IGMP message is a join or leave message, indicating that the user terminal 100 requests participation in or withdrawal from a specific multicast group. The message-type determining unit 202 determines whether the IGMP message is a join message or a leave message (step S102). When the IGMP message is a join message (YES at step S102), the table controlling unit 203 updates the subscriber-information table 204 (step S103). Thus, the subscriber-information table 204 stores therein information on the participation of the user terminal 100: the sender of the IGMP message, in the multicast group.

Referring to the updated subscriber-information table 204, the table controlling unit 203 determines whether the user terminal 100 is the first to join the multicast group (step S104). Taking the subscriber-information table 204 of FIG. 3A as an example, there is no participant in the multicast group C. Consequently, if the user terminal #1 sends a join message for the multicast group C, the user terminal #1 is the first to join the multicast group C.

If the user terminal 100 is not the first to join the multicast group (NO at step S104), i.e., another user terminal 100 than this sender user terminal 100 has already joined the multicast group, a connection to the multicast group has already been established. Therefore, in this case, there is no need to request the OLT 300 to establish a new connection. When receiving multicast data for the multicast group from the OLT 300, the ONU 200 sends the multicast data to this sender user terminal 100 without performing the process for connection control.

If the user terminal 100 is the first to join the multicast group (YES at step S104), it is necessary to establish a connection to the multicast group. The CID obtaining unit 205 obtains from the CID table 206 the CID of the connection to the multicast group (step S105). The CID obtaining unit 205 informs the C control-message generating unit 207 that the connection with the obtained CID is to be established. The C control-message generating unit 207 generates a connection-request message that contains the CID and a request for the connection with the CID. The C control-message transmitting unit 208 sends the connection-request message to the OLT 300 (step S106).

When the IGMP message is a leave message (NO at step S102), the table controlling unit 203 updates the subscriber-information table 204 (step S107). Thus, the subscriber-information table 204 stores therein information on the withdrawal of the user terminal 100: the sender of the IGMP message, from the multicast group.

Referring to the updated subscriber-information table 204, the table controlling unit 203 determines whether the user terminal 100 is the last to leave the multicast group (step S108). Taking the subscriber-information table 204 of FIG. 3A as an example, only the user terminal #2 participates in the multicast group B. Consequently, if the user terminal #2 sends a leave message for the multicast group B, the user terminal #2 is the last to leave the multicast group B.

If the user terminal 100 is not the last to leave the multicast group (NO at step S108), i.e., another user terminal 100 than this sender user terminal 100 still joins the multicast group, a connection to the multicast group has to be maintained. Therefore, in this case, there is no need to request the OLT 300 to remove the connection. When receiving multicast data for the multicast group from the OLT 300, the ONU 200 just stops sending the multicast data to this sender user terminal 100 without performing the process for connection control.

If the user terminal 100 is the last to leave the multicast group (YES at step S108), it is necessary to remove the connection to the multicast group. The CID obtaining unit 205 obtains from the CID table 206 the CID of the connection to the multicast group (step S109). The CID obtaining unit 205 informs the C control-message generating unit 207 that the connection with the obtained CID is to be removed. The C control-message generating unit 207 generates a disconnection-request message that contains the CID and a request to remove the connection with the CID. The C control-message transmitting unit 208 sends the disconnection-request message to the OLT 300 (step S110).

As described above, according to the first embodiment, on every receipt of an IGMP message from the user terminal 100, the ONU 200 determines whether it is necessary to establish or remove a connection to a multicast group according to the content of the IGMP message. Only when a connection or disconnection is required, the ONU 200 sends the OLT 300 a C control message instead of the IGMP message. With the C control message, the ONU 200 need not send the OLT 300 a multicast-control message and a connection-control message separately, and can request the OLT 300 to establish or remove a connection. In addition, the OLT 300 can determine whether there is participation in or withdrawal from a multicast group.

Figure 7:
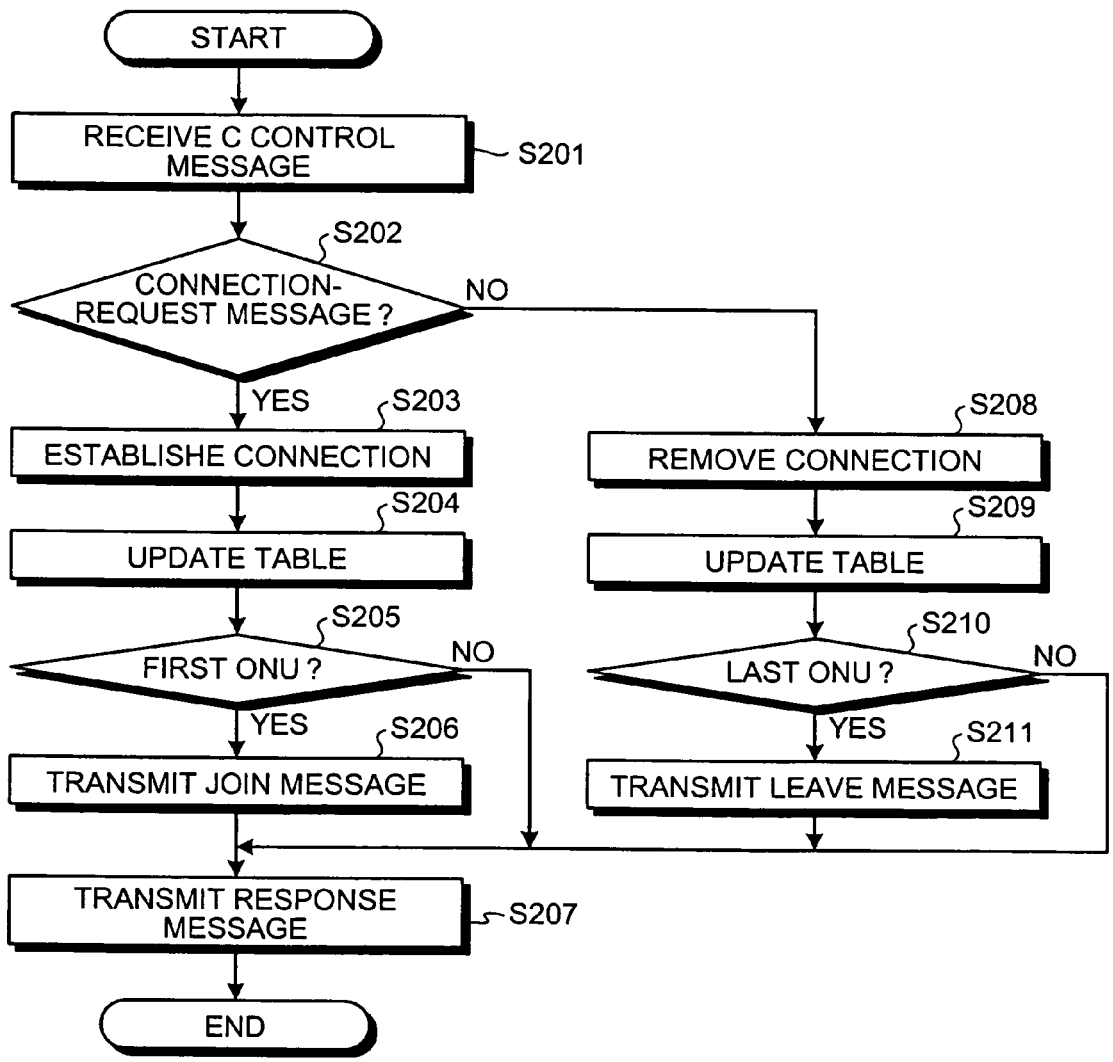
FIG. 7 is a flowchart of the operation of the OLT shown in FIG. 4.

FIG. 7 is a flowchart of the operation of the OLT 300. First, the C control-message receiving unit 301 receives a C control message sent from the ONU 200 in the manner previously described (step S201). The C control-message is a connection or disconnection-request message, indicating that the ONU 200 requests a connection to or disconnection from a specific multicast group. The request-type determining unit 302 determines whether the C control message is a connection-request message or a disconnection-request message (step S202). When the C control-message is a connection-request message (YES at step S202), the connection controlling unit 305 establishes a connection to the ONU 200: the sender of the C control-message (step S203). In addition, the table updating unit 303 updates the multicast-management table 304 (step S204). The table updating unit 303 informs the table monitoring unit 307 that the multicast-management table 304 has been updated. Thus, the multicast-management table 304 stores therein information that a connection for a specific multicast group is established between the OLT 300 and the ONU 200.

When informed by the table updating unit 303 that the multicast-management table 304 has been updated, the table monitoring unit 307 refers to the multicast-management table 304 to determine whether the ONU 200 is the first to have a connection to the multicast group (step S205). Taking the multicast-management table 304 of FIG. 5 as an example, only the ONU #2 has a connection to the multicast group B. Namely, the ONU #2 is the first one having a connection to the multicast group B.

If the ONU 200 is not the first to have a connection to the multicast group (NO at step S205), i.e., another ONU 200 than this sender ONU 200 has already requested the OLT 300 to forward multicast data for the multicast group, the OLT 300 has already received the multicast data. Therefore, in this case, there is no need to send a request for participation in the multicast group to the router 400 and the server 500, and the OLT 300 does not send an IGMP-message to the router 400. The response-message transmitting unit 306 sends the ONU 200 a response message informing that the connection has been established (step S207). When the OLT 300 receives multicast data for the multicast group from the router 400, the multicast data is also sent to this ONU 200 newly having a connection to the multicast group.

If the ONU 200 is the first to have a connection to the multicast group (YES at step S205), it is necessary to request the router 400 to send the OLT 300 the multicast data. Therefore, the IGMP-message generating unit 308 generates a join message for the multicast group. The IGMP-message transmitting unit 309 sends the join message to the router 400 (step S206). With the join message, the response-message transmitting unit 306 sends the ONU 200 a response message informing that the connection has been established (step S207). Incidentally, the response-message transmitting unit 306 can send the ONU 200 a response message immediately after the connection controlling unit 305 establishes a connection regardless of whether the ONU 200 is the first to have a connection to a multicast group.

When the C control-message is a disconnection-request message (NO at step S202), the connection controlling unit 305 removes a connection to the ONU 200: the sender of the C control-message (step S208). In addition, the table updating unit 303 updates the multicast-management table 304 (step S209). Thus, the multicast-management table 304 stores therein information that no connection for a specific multicast group is established between the OLT 300 and the ONU 200.

When informed by the table updating unit 303 that the multicast-management table 304 has been updated, the table monitoring unit 307 refers to the multicast-management table 304 to determine whether the ONU 200 is the last to lose a connection to the multicast group (step S210). In other words, referring to the multicast-management table 304, the table monitoring unit 307 determines whether there is no ONU 200 having a connection to the multicast group after the connection to this sender ONU 200 is removed.

If the ONU 200 is not the last to lose a connection to the multicast group (NO at step S210), i.e., another ONU 200 than this sender ONU 200 still requests the OLT 300 to forward multicast data for the multicast group, the OLT 300 has to continue receiving the multicast data. Therefore, in this case, there is no need to send a request for withdrawal from the multicast group to the router 400, and the OLT 300 does not send an IGMP-message to the router 400. The response-message transmitting unit 306 sends the ONU 200 a response message informing that the connection has been removed (step S207). When the OLT 300 receives multicast data for the multicast group from the router 400, the multicast data is not sent to this ONU 200 that has lost a connection to the multicast group.

If the ONU 200 is the last to lose a connection to the multicast group (YES at step S210), it is necessary to request the router 400 to stop sending the OLT 300 the multicast data. Therefore, the IGMP-message generating unit 308 generates a leave message for the multicast group. The IGMP-message transmitting unit 309 sends the leave message to the router 400 (step S211). With the leave message, the response-message transmitting unit 306 sends the ONU 200 a response message informing that the connection has been removed (step S207). Incidentally, the response-message transmitting unit 306 can send the ONU 200 a response message immediately after the connection controlling unit 305 removes a connection regardless of whether the ONU 200 is the last to lose a connection to a multicast group. The response message is not necessarily the one that indicates connection establishment or removal. The response message can be an acknowledgement indicating that a C control message has been received and proper connection control has been performed.

As just described, based on a C control message from each downstream ONU 200, the OLT 300 can manage information on which multicast group's data is required by the ONU 200 using the multicast-management table 304. Referring to the multicast-management table 304, the OLT 300 can determine whether there is participation in or withdrawal from a multicast group. Thus, the OLT 300 can properly send an IGMP message to the upstream router 400 as required without receiving IGMP messages from the user terminals 100.

Figure 8:
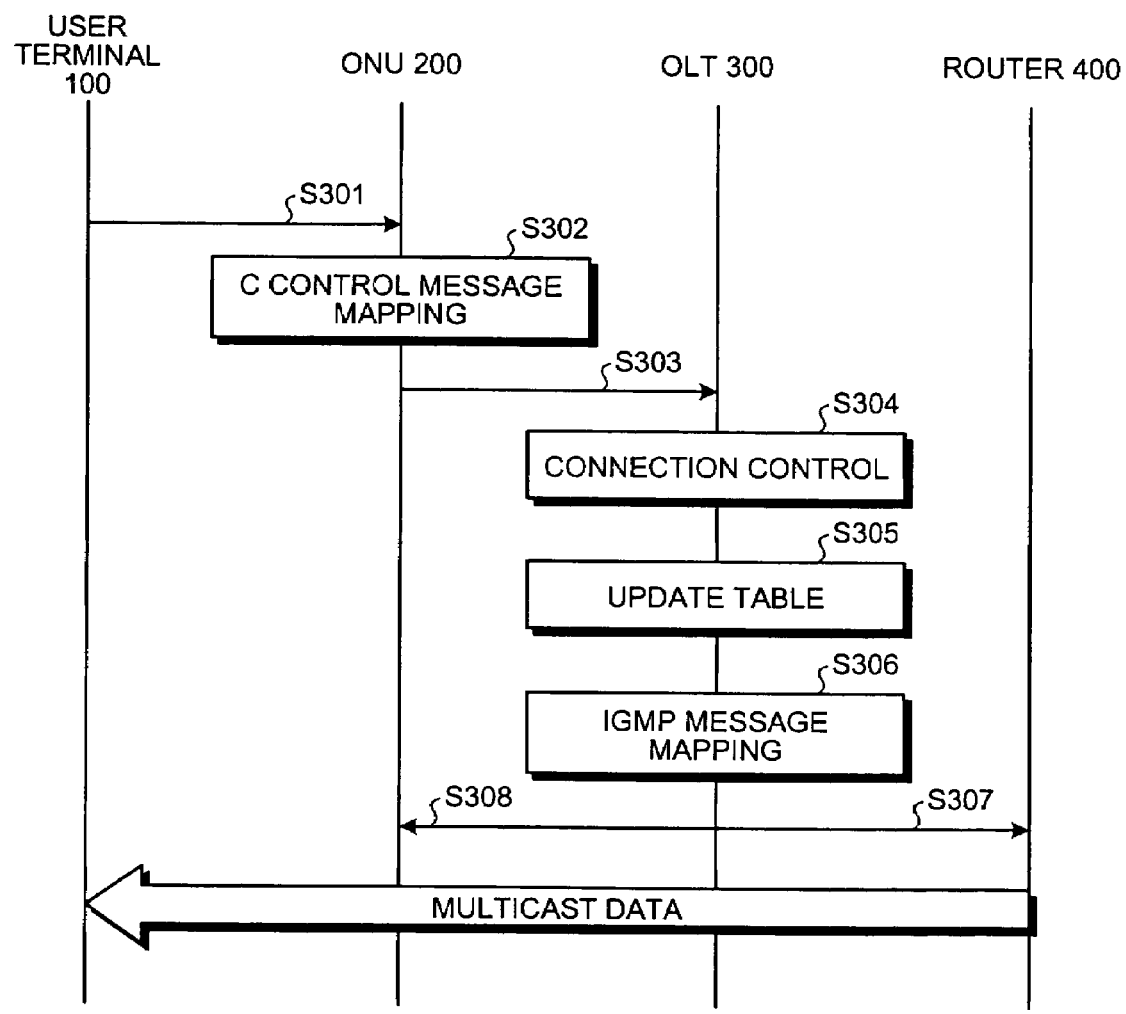
FIG. 8 is a sequence diagram of a connection-establishment process.

FIG. 8 is a sequence diagram of an example of the connection-establishment process performed when the user terminal 100 participates in a new multicast group.

When the user terminal 100 wishes to join a multicast group, the user terminal 100 sends a join message for the desired multicast group to the upstream ONU 200 (step S301). On receipt of the join message, the ONU 200 checks whether there is any downstream user terminal 100 that has already joined the multicast group referring to the subscriber-information table 204. It is assumed here that this sender user terminal 100 is the first to join the multicast group. Thus, a connection to the multicast group needs to be established. The CID of the connection to the multicast group and a connection request are mapped to a C control message (step S302). More specifically, the CID obtaining unit 205 obtains from the CID table 206 the CID of the connection to the desired multicast group. The C control-message generating unit 207 generates a connection-request message that contains the obtained CID and a request for the connection with the CID. The C control-message transmitting unit 208 sends the connection-request message to the OLT 300 (step S303).

The C control-message receiving unit 301 of the OLT 300 receives the connection-request message from the ONU 200. The connection controlling unit 305 establishes the connection (step S304). At the same time, the table updating unit 303 updates the multicast-management table 304 (step S305). That is, the multicast-management table 304 stores therein information that this sender ONU 200 newly requires multicast data for the multicast group.

It is assumed here that this ONU 200 is the first one that requires the multicast data. The OLT 300 has to send a request for participation in the multicast group to the router 400. Accordingly, a request for participation is mapped to an IGMP message (step S306). That is, the IGMP-message generating unit 308 generates a join message for the multicast group. The IGMP-message transmitting unit 309 sends the join message to the router 400 (step S307). Besides, the response-message transmitting unit 306 sends the ONU 200 a response message informing that the connection has been established (step S308).

The router 400 sends the received join message to the server 500. In response to the join message, the server 500 sends the multicast data for the multicast group to the router 400. The router 400 forwards the multicast data to the OLT 300. The multicast data is forwarded from the OLT 300 to the ONU 200 through the connection established by the connection controlling unit 305. Thus, the ONU 200 delivers the multicast data to the user terminal 100, which has requested for participation in the multicast group.

As described above, according to the first embodiment, the ONU sends a C control message only once to the OLT in the process of connection control. Thereby, it is possible to minimize the amount of traffic caused by control information for connection establishment and multicasting on media (optical fiber) used for communication between the ONU and the OLT. In other words, the waste of media due to the control information can be suppressed. Thus, it is possible to reduce the pressure on bandwidth for other users.

Besides, The ONU determines whether it is necessary to request the OLT to establish or remove a connection for a multicast group according to the number of participants in the multicast group from all the downstream user terminals. Only when such a request is required, the ONU sends a connection-control message to the OLT, which minimizes the transmission of messages. On receipt of the connection-control message, the OLT performs connection control according to need. Based on the existence of a connection for a multicast group, the OLT determines whether the downstream ONU needs multicast data. Thus, in a communication system that requires connection setup before multicasting, communications media can be effectively utilized, and services can be improved.

In the following, a second embodiment of the present invention is explained. According to the second embodiment, the ONU sends a query to each user terminal at regular intervals to check the number of participants in a multicast group.

The ONU sends a response from the user terminal to the OLT if necessary so that the multicast-management table of the OLT can always be updated. When the OLT receives a query from an upstream node, the OLT refers to the multicast-management table to return a response to the query.

A multicast system of the second embodiment is in many respects basically similar to that of the first embodiment shown in FIG. 1. Any description for the previous embodiment is incorporated herein insofar as the same is applicable, and the same description is not repeated.

Figure 9:
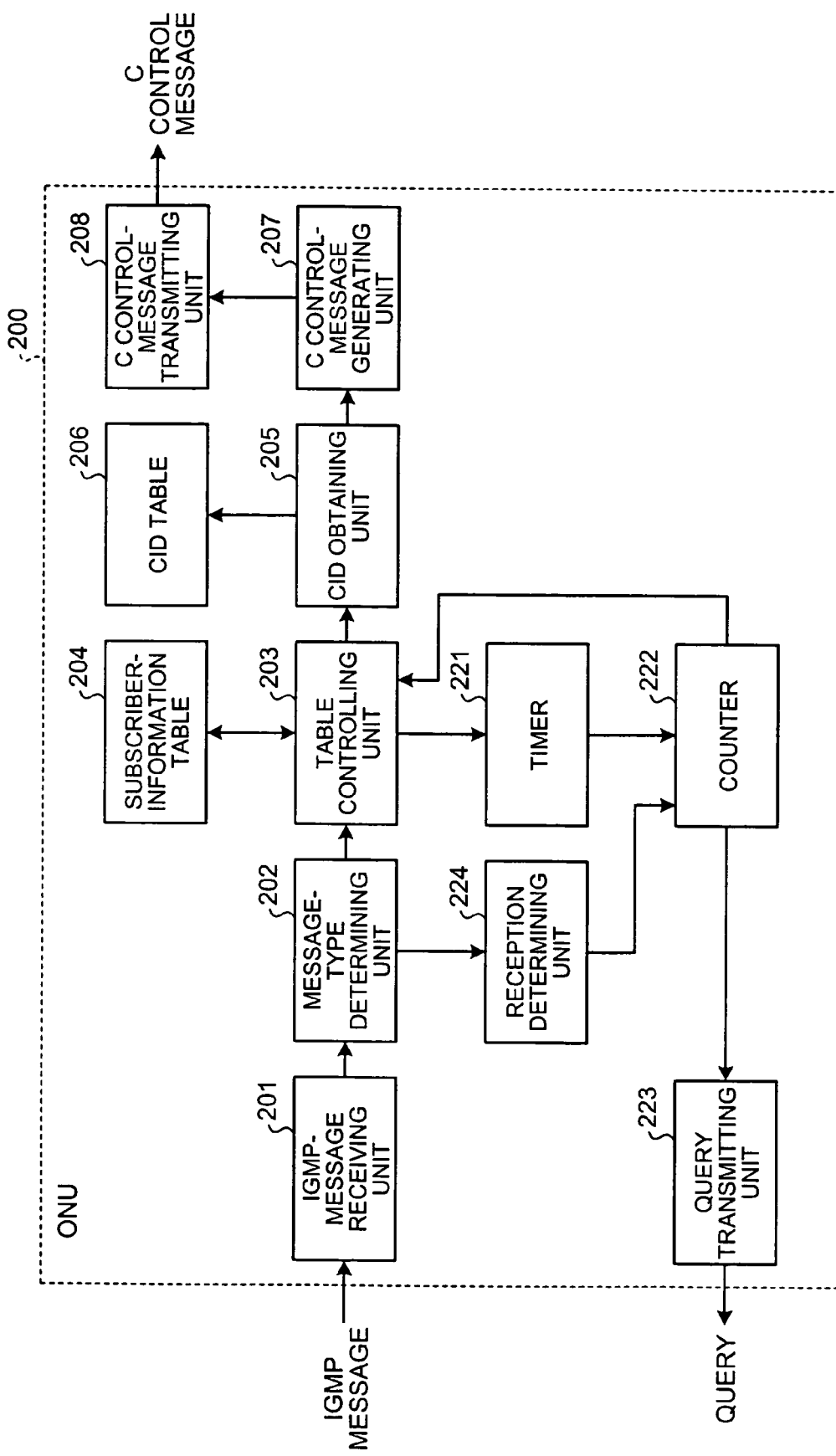
FIG. 9 is a detailed block diagram of an ONU according to a second embodiment of the present invention.

FIG. 9 is a detailed block diagram of the ONU 200 according to the second embodiment, wherein like reference numerals refer to like parts as in FIG. 2. In addition to the components shown in FIG. 2, the ONU 200 further includes a timer 221, a counter 222, a query transmitting unit 223, and a reception determining unit 224.

The timer 221 starts counting after the table controlling unit 203 stores in the subscriber-information table 204 information that the user terminal 100 subscribes to a multicast group. After every elapse of a predetermined time, the timer 221 informs the counter 222 that the predetermined time has elapsed. The timer 221 counts the time with respect to each multicast group.

The counter 222 increments a counter value for a corresponding multicast group when informed by the timer 221 that the predetermined time has elapsed. Subsequently, the counter 222 determines whether the counter value reaches a predetermined value. If not, the counter 222 instructs the query transmitting unit 223 to transmit a query. When the counter value reaches the predetermined value, the counter 222 informs the table controlling unit 203 that there is no user terminal 100 that participates in a multicast group corresponding to the counter value. When the reception determining unit 224 determines that a join message for a multicast group is received as a response to a query, the counter 222 resets a counter value for the multicast group.

The query transmitting unit 223 sends a query to all the downstream user terminals 100 according to an instruction from the counter 222. The query checks whether any user terminal 100 still participates in a multicast group after the predetermined time has passed from when information on participation in the multicast group was stored in the subscriber-information table 204.

The reception determining unit 224 determines whether a join message for a multicast group is received as a response to a query within a predetermined time from when the query transmitting unit 223 transmits the query. If a join message for a multicast group is received, the reception determining unit 224 instructs the counter 222 to reset a counter value for the multicast group.

Figure 10:
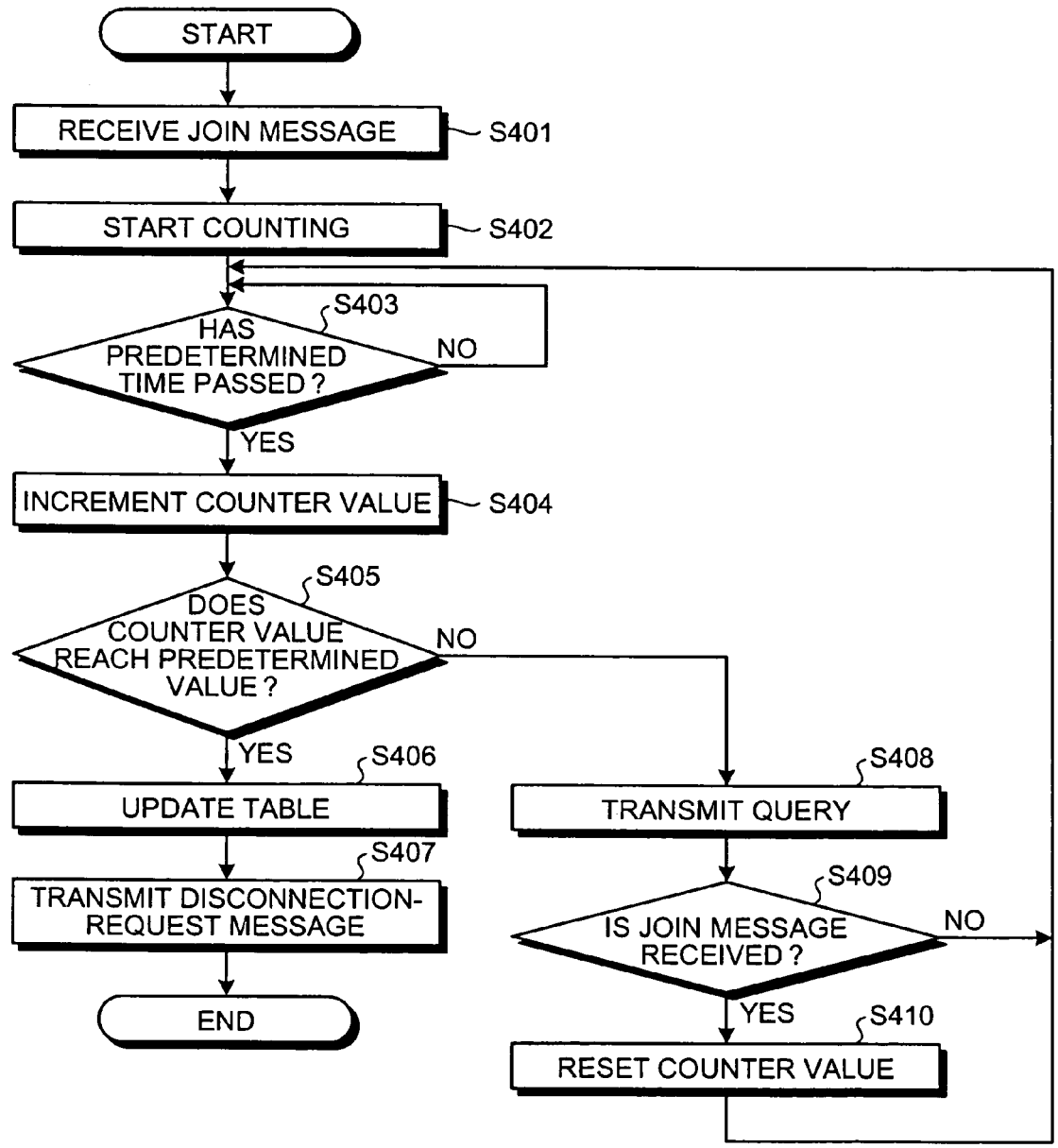
FIG. 10 is a flowchart of the operation of the ONU shown in FIG. 9.

FIG. 10 is a flowchart of the operation of the ONU 200. First, the IGMP-message receiving unit 201 receives a join message for a multicast group from the user terminal 100 (step S401). On receipt of the join message, the table controlling unit 203 stores in the subscriber-information table 204 information that the user terminal 100 subscribes to the multicast group. It is also assumed here that this sender user terminal 100 is the first to join the multicast group.

After the subscriber-information table 204 is updated by the table controlling unit 203, the timer 221 starts counting (step S402). The timer 221 monitors the elapse of a predetermined time (step S403). If the predetermined time has elapsed (YES at step S403), the counter 222 increments a counter value for the multicast group (step S404). The counter 222 determines whether the counter value reaches a predetermined value (step S405). If not (NO at step S405), the counter 222 instructs the query transmitting unit 223 to transmit a query. The query transmitting unit 223 sends a query to all the downstream user terminals 100 to check whether any user terminal 100 still participates in the multicast group (step S408).

Having received the query, each user terminal 100 returns a join message for the multicast group to the ONU 200 if the user terminal 100 participates in the multicast group. The reception determining unit 224 determines whether a join message for the multicast group is received as a response to the query within a predetermined time from when the query is transmitted (step S409). If a join message for the multicast group is received (YES at step S409), the reception determining unit 224 instructs the counter 222 to reset the counter value for the multicast group (step S410). The counter 222 then waits to be informed by the timer 221 of the next elapse of the predetermined time. If a join message for the multicast group is not received within the predetermined time (NO at step S409), the counter 222 waits to be informed by the timer 221 of the next elapse of the predetermined time while maintaining the counter value.

As long as no user terminal 100 returns a join message in response to a query, the counter 222 increments the counter value for the multicast group after every elapse of the predetermined time. When the counter value reaches the predetermined value (YES at step S405), the counter 222 determines that there is no user terminal 100 that participates in the multicast group. The counter 222 informs the table controlling unit 203 of the result of the determination. Accordingly, the table controlling unit 203 updates the subscriber-information table 204 (step S406). That is, the information that the user terminal 100 subscribes to the multicast group is deleted from the subscriber-information table 204.

The CID obtaining unit 205 is informed that there is no participant in the multicast group. After that, in the same manner as previously described for the case where the last user terminal 100 leaves the multicast group, the C control-message generating unit 207 generates a disconnection-request message. The C control-message transmitting unit 208 sends the disconnection-request message to the OLT 300 (step S407).

As described above, according to the second embodiment, the ONU 200 checks the number of participants in a multicast group at regular intervals. Consequently, even if the ONU 200 receives no leave message, the ONU 200 can detects a multicast group, in which no user terminal 100 participates, and can request the OLT 300 to remove a connection for the multicast group. Thereby, an unnecessary connection is not maintained between the ONU 200 and the OLT 300. Moreover, the OLT 300 is informed of the latest number of participants in a multicast group.

Figure 11:
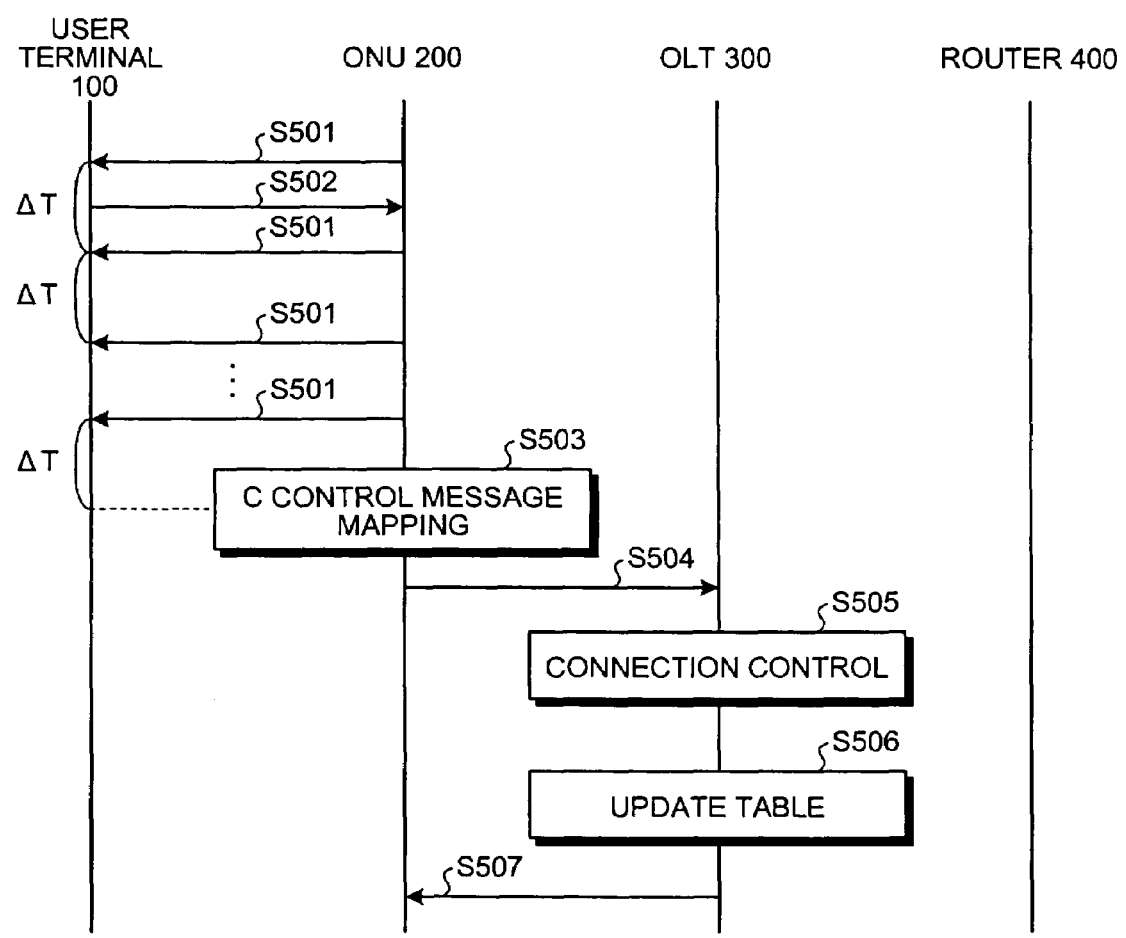
FIG. 11 is a sequence diagram of a query-transmission process.

FIG. 11 is a sequence diagram of the connection-removal process, as an example of connection control, performed when the user terminal 100 leaves a multicast group without sending a leave message to the ONU 200.

While the user terminal 100 is participating in a multicast group, the query transmitting unit 223 of the ONU 200 sends a query to the user terminal 100 at a regular time interval $\Delta T$ (step S501). In response to a query, the user terminal 100 returns a join message for a multicast group relevant to the query to the ONU 200 if the user terminal 100 participates in the multicast group (step S502).

When the reception determining unit 224 determines that a join message for the multicast group is received in response to the query, the counter 222 resets a counter value for the multicast group. The query transmitting unit 223 transmits a query after every elapse of the time interval $\Delta T$ counted by the timer 221 (step S501). After the user terminal 100 leaves the multicast group without sending a leave message to the ONU 200, the ONU 200 receives no join message from the user terminal 100 in response to a query, i.e., the reception determining unit 224 never determines that a join message is received in response to a query.

The counter 222 increments the counter value for the multicast group, without resetting, each time the query transmitting unit 223 retransmits a query after the elapse of the time interval $\Delta T$. When the counter value reaches a predetermined value, the counter 222 determines that there is no user terminal 100 that participates in the multicast group. The counter 222 informs the table controlling unit 203 of the result of the determination. Accordingly, the table controlling unit 203 updates the subscriber-information table 204.

Because all the user terminals 100 have left the multicast group, a connection to the multicast group needs to be removed. The CID of the connection to the multicast group and a disconnection request are mapped to a C control message (step S503). More specifically, the CID obtaining unit 205 obtains from the CID table 206 the CID of the connection to the multicast group. The C control-message generating unit 207 generates a disconnection-request message that contains the obtained CID and a request to remove the connection with the CID. The C control-message transmitting unit 208 sends the disconnection-request message to the OLT 300 (step S504).

The C control-message receiving unit 301 of the OLT 300 receives the disconnection-request message from the ONU 200. The connection controlling unit 305 removes the connection (step S505). At the same time, the table updating unit 303 updates the multicast-management table 304 (step S506). That is, the multicast-management table 304 stores therein information that this sender ONU 200 does not require multicast data for the multicast group. The response-message transmitting unit 306 sends the ONU 200 a response message informing that the connection has been removed (step S507).

At this point, the multicast-management table 304 is updated and contains the latest information. Thus, having received a query about the number of participants in a multicast group from the upstream router 400, the OLT 300 need not inquire each user terminal 100 about participation in the multicast group via the ONU 200. The OLT 300 refers to the multicast-management table 304, and thereby sends a join message to the router 400 as a response to the query.

Figure 12:
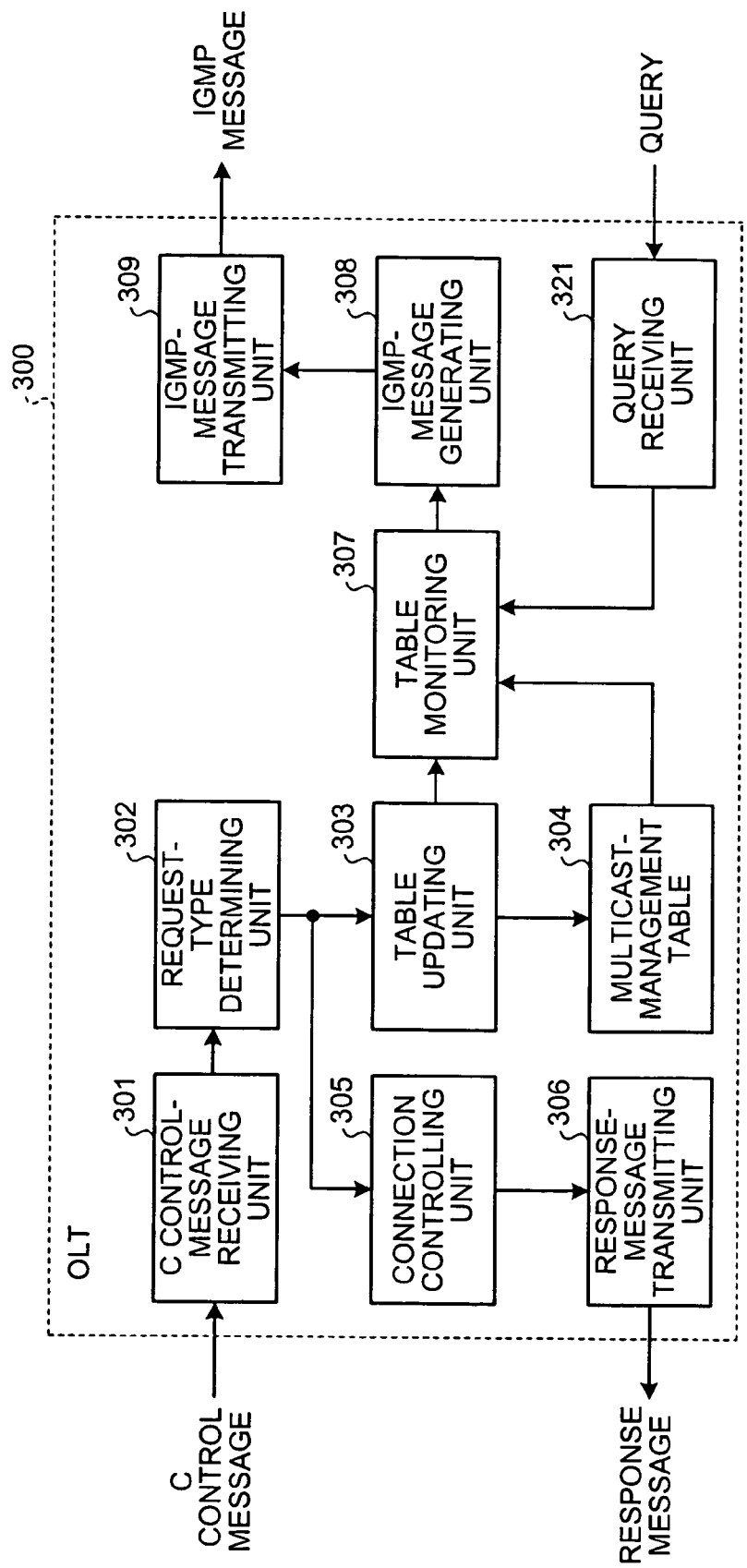
FIG. 12 is a detailed block diagram of an OLT according to the second embodiment.

FIG. 12 is a detailed block diagram of the OLT 300 according to the second embodiment, wherein like reference numerals refer to like parts as in FIG. 4. The OLT 300 of the second embodiment is of essentially the same construction except that it includes a query receiving unit 321. The query receiving unit 321 receives a query from the upstream router 400, and informs the table monitoring unit 307 of the received query.

The table monitoring unit 307 refers to the multicast-management table 304 to check the number of participants in a multicast group asked by the query. In other words, the table monitoring unit 307 checks whether there is any ONU 200 that requires multicast data for the multicast group. The table monitoring unit 307 can obtain the latest number of participants because the ONU 200 sends a query to each user terminal 100 at regular intervals and the results obtained by the query is reflected in the multicast-management table 304.

According to the result of the check by the table monitoring unit 307, if participation in the multicast group is still required, the IGMP-message transmitting unit 309 sends a join message to the router 400. If participation in the multicast group is not required any more, the IGMP-message transmitting unit 309 sends a leave message to the router 400.

As described above, according to the second embodiment, the ONU checks the number of participants in a multicast group from downstream user terminals at regular intervals. When connection control is required between the ONU and the OLT, the ONU sends a connection-control message to the OLT. Consequently, the multicast-management table of the OLT is always updated. Therefore, having received a query from an upstream node, the OLT can send back information about participation in a multicast group without making an inquiry to each user terminal or the ONU. Thus, traffic caused by control information can be reduced between the ONU and the OLT, and control delay can be reduced.

In the following, a third embodiment of the present invention is explained. According to the third embodiment, when the ONU receives a leave message from the user terminal, the ONU waits for a join message sent immediately after the leave message from the same user terminal. On receipt of a join message, the ONU requests the OLT for connection changeover.

A multicast system of the third embodiment is in many respects basically similar to that of the first embodiment shown in FIG. 1. Any description for the previous embodiment is incorporated herein insofar as the same is applicable, and the same description is not repeated.

Figure 13:
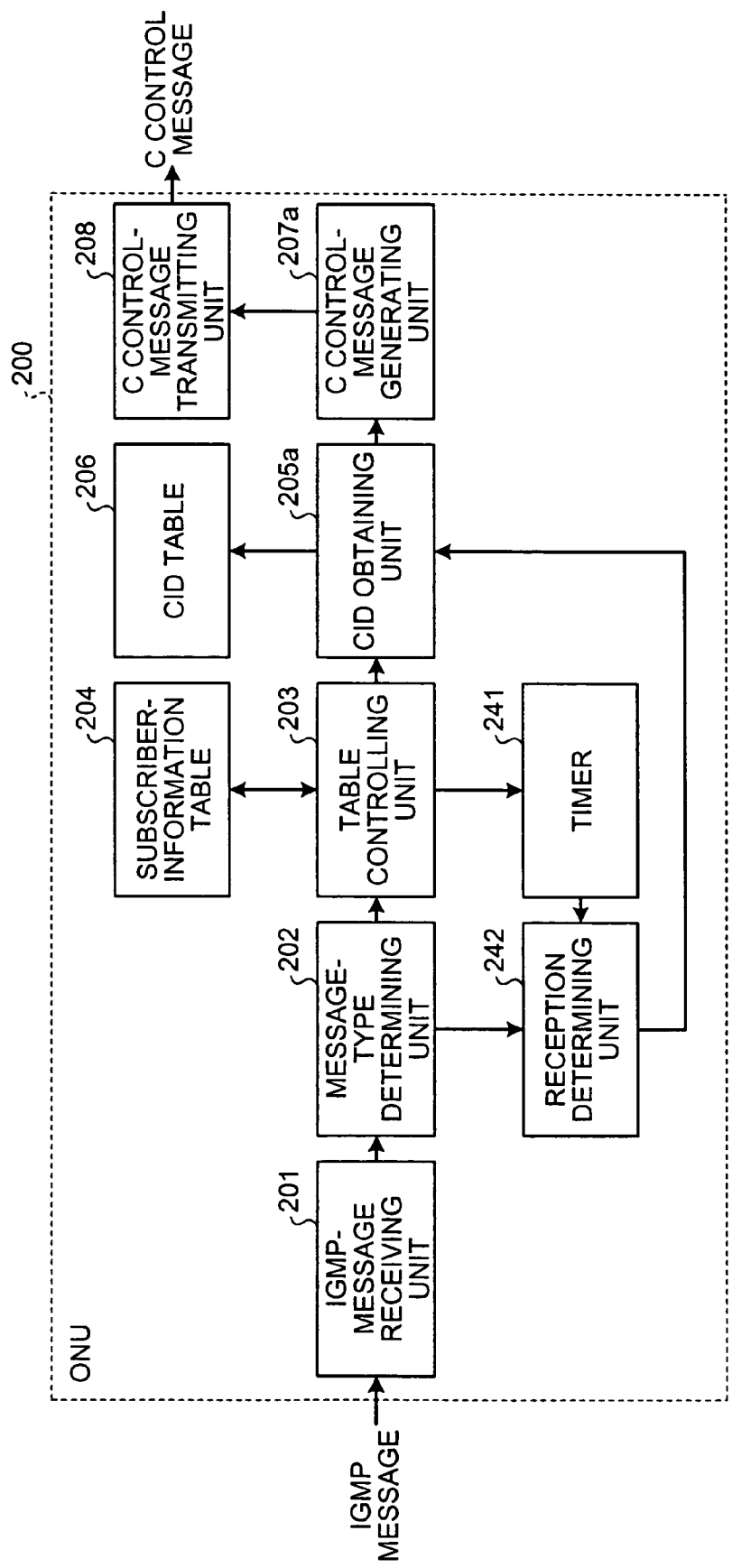
FIG. 13 is a detailed block diagram of an ONU according to a third embodiment of the present invention.

FIG. 13 is a detailed block diagram of the ONU 200 according to the third embodiment, wherein like reference numerals refer to like parts as in FIG. 2. In addition to the components shown in FIG. 2, the ONU 200 also includes a timer 241 and a reception determining unit 242. Further, the CID obtaining unit 205 and the C control-message generating unit 207 are replaced by a CID obtaining unit 205*a* and a C control-message generating unit 207*a*, respectively.

According to information from the table controlling unit 203, the CID obtaining unit 205*a* obtains from the CID table 206 the CID of a connection to be established or removed. The CID obtaining unit 205*a* informs the C control-message generating unit 207*a* that the connection with the obtained CID is to be established or removed. Having been informed by the reception determining unit 242 of the receipt of a join message within a predetermined time when the information indicates the removal of a connection, the CID obtaining unit 205*a* determines whether both connection establishment and removal are required. If both connection establishment and removal are required, the CID obtaining unit 205*a* obtains from the CID table 206 the CIDs of connections to be established and removed, respectively. The CID obtaining unit 205*a* outputs the CIDs with information on connection changeover to the C control-message generating unit 207*a*.

According to information from the CID obtaining unit 205*a*, the C control-message generating unit 207*a* generates a C control message. The C control message includes a connection-request message to establish a connection and a disconnection-request message to remove a connection. When the information indicates a connection changeover, the C control-message generating unit 207*a* generates a connection-changeover message that contains the CIDs of connections to be established and removed, respectively.

The timer 241 starts counting after the table controlling unit 203 stores in the subscriber-information table 204 information that the last user terminal 100 leaves a multicast group. After every elapse of a predetermined time, the timer 241 informs the reception determining unit 242 that the predetermined time has elapsed. The timer 241 counts the time with respect to each multicast group.

The reception determining unit 242 monitors IGMP messages each classified as a join or leave message by the message-type determining unit 202. The reception determining unit 242 determines whether a join message for a multicast group is received from the last user terminal 100 that has sent a leave message for another multicast group within a predetermined time from when the timer 241 starts counting. If a join message for a multicast group is received from the last user terminal 100 that leaves another multicast group, the reception determining unit 242 informs the CID obtaining unit 205a of the receipt of the join message.

Figure 14:
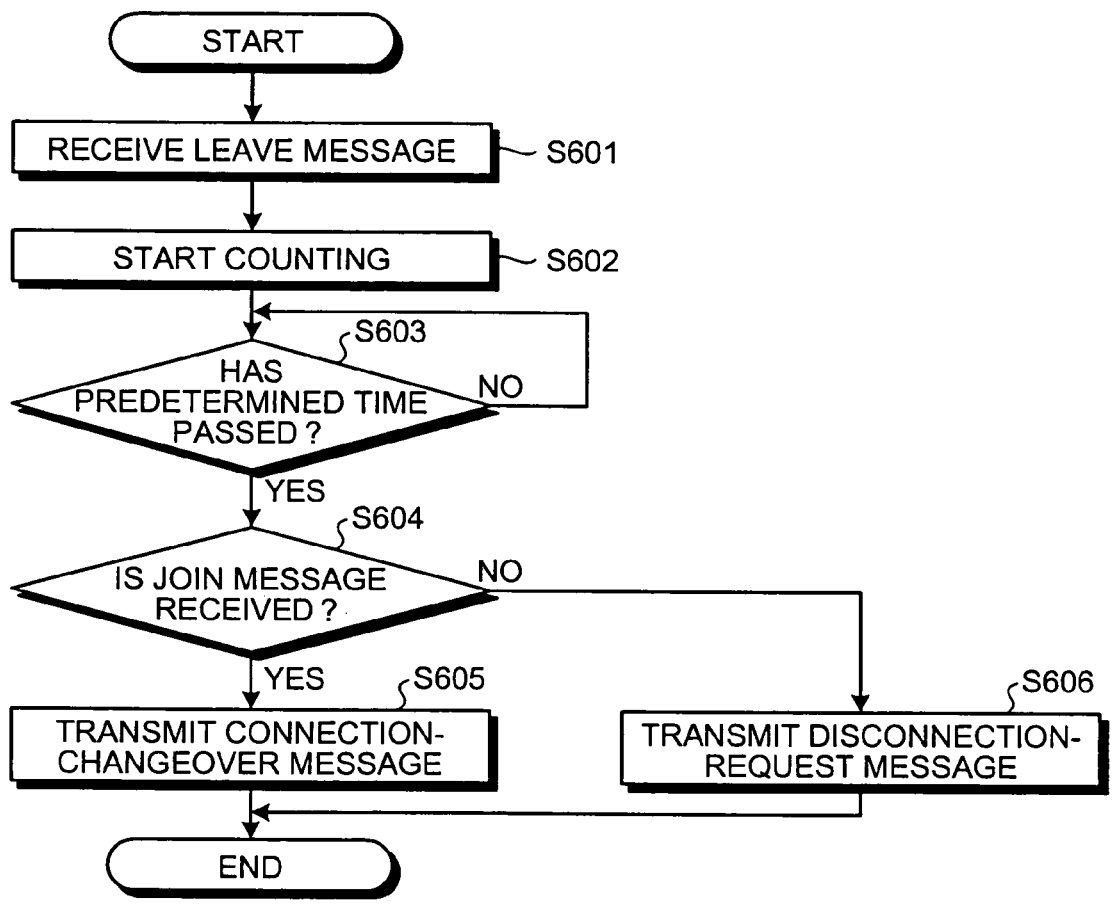
FIG. 14 is a flowchart of the operation of the ONU shown in FIG. 13.

FIG. 14 is a flowchart of the operation of the ONU 200. First, the IGMP-message receiving unit 201 receives a leave message from the user terminal 100 (step S601). On receipt of the leave message, the table controlling unit 203 stores in the subscriber-information table 204 information that the user terminal 100 leaves a multicast group. It is assumed here that this user terminal 100 is the last to leave the multicast group.

Simultaneously with the update of the subscriber-information table 204 by the table controlling unit 203, the timer 241 starts counting (step S602). The timer 241 monitors the elapse of a predetermined time (step S603). If the predetermined time has elapsed (YES at step S603), the timer 241 informs the reception determining unit 242 that the predetermined time has elapsed. The reception determining unit 242 monitors the results of determinations on IGMP messages made by the message-type determining unit 202 from when the timer 241 starts counting until the elapse of the predetermined time. The reception determining unit 242 determines whether a join message for a multicast group is received from the user terminal 100 that has sent a leave message for another multicast group (step S604).

If the user terminal 100 requires a connection changeover to leave a multicast group, the user terminal 100 is likely to request to join another multicast group immediately after leaving the previous one. Accordingly, if the ONU 200 receives a leave message from the user terminal 100, the ONU 200 does not send a disconnection-request message to the OLT 300 right after the leave message is received, but waits for a join message from this user terminal 100.

When determining that a join message is received (YES at step S604), the reception determining unit 242 informs the CID obtaining unit 205a of the receipt of the join message. The CID obtaining unit 205a determines whether the join message is sent from the user terminal 100 that is the first to join a multicast group. It is assumed here that this join message is sent from the user terminal 100 that is the first to join a multicast group. In this case, the CID obtaining unit 205a determines that a changeover from one multicast group to another is required. The CID obtaining unit 205a obtains from the CID table 206 the CIDs of connections to both the multicast groups, i.e., the multicast group the user terminal 100 is to leave and that the user terminal 100 is to join.

The CID obtaining unit 205a outputs the CIDs with information on connection changeover to the C control-message generating unit 207a. The C control-message generating unit 207a generates a connection-changeover message that contains the two CIDs. The C control-message transmitting unit 208 sends the generated connection-changeover message to the OLT 300 (step S605).

When determining that a join message is not received (NO at step S604), the reception determining unit 242 informs the CID obtaining unit 205a of the result of the determination. As in the first embodiment, the CID obtaining unit 205a obtains from the CID table 206 the CID of a connection to the multicast group the user terminal 100 is to leave. The C control-message generating unit 207a generates a disconnection-request message. The C control-message transmitting unit 208 sends the disconnection-request message to the OLT 300 (step S606).

As described above, according to the third embodiment, if the ONU receives a leave message from the last user terminal that leaves a multicast group, the ONU 200 does not send a disconnection-request message to the OLT right after the leave message is received. When receiving a join message for another multicast group from the same user terminal, the ONU sends a connection-changeover message to the OLT. Thus, traffic caused by control information can be further reduced between the ONU and the OLT.

As set forth herein above, according to the embodiments of the present invention, a first communication apparatus (ONU) sends a second communication apparatus (OLT) a connection-control message that contains information on the necessity or unnecessity of a connection. Based on the existence of a connection, the second communication apparatus determines whether the first communication apparatus needs multicast data, and performs connection control as required In other words, the first communication apparatus can send the second communication apparatus control information concerning both multicasting and a connection at once. Thus, in a communication system that requires connection setup before multicasting, communications media can be effectively utilized, and services can be improved.

Having received a message from a user terminal, the first communication apparatus determines whether the user terminal is the first to request the delivery of multicast data, or determines whether the user terminal is the last to request to stop the delivery of multicast data. Thereby, the first communication apparatus sends a connection-control message to the second communication apparatus only when necessary. Thus, it is possible to reduce the number of times the first communication apparatus transmits a connection-control message.

Besides, information on the necessity and unnecessity of transferring multicast data is always updated in the second communication apparatus. Based on the information, the second communication apparatus sends an upstream node a request for the delivery of multicast data or a request to stop the delivery of multicast data. Thus, it is possible to reduce the number of times the second communication apparatus transmits a request for multicast data, as well as to prevent waste of bandwidth for multicasting. In addition, the second communication apparatus can sends the upstream node information as to whether multicast data is required without making an inquiry to downstream user terminals or the first communication apparatus.

When a user terminal requests a changeover from one multicast data to another, the first communication apparatus can request both connection establishment and removal at the same time. Thus, it is possible to further reduce the number of times the first communication apparatus transmits a connection-control message.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multicast system comprising:
   a plurality of terminal units;
   a first communication apparatus that sends a request for transmission of multicast data to a second communication apparatus and delivers multicast data to at least one of the terminal units upon receiving the multicast data from the second communication apparatus; and
   the second communication apparatus that establishes a connection with the first communication apparatus upon receiving a request from the first communication apparatus and transmits requested multicast data to the first communication apparatus through the connection, wherein the first communication apparatus includes
- a first multicast-control message receiving unit that receives a first multicast-control message from a terminal unit among the terminal units requesting delivery of multicast data;
- a determining unit that determines whether a connection needs to be established for multicast data specified by received first multicast-control message based on the first multicast-control message; and
- a connection-control message transmitting unit that transmits, according to the determination by the determining unit, a connection-control message to request connection establishment when a connection is required, and a connection-control message to request connection removal when a connection is not required, and the second communication apparatus includes
- a connection-control-message receiving unit that receives a connection-control message from the first communication apparatus;
- a connection controlling unit that controls a connection to the first communication apparatus according to received connection-control message; and
- a storage unit that stores therein a connection established by the connection controlling unit in association with corresponding multicast data.

2. The multicast system according to claim 1, wherein
the first multicast-control message is a request from the terminal unit for the delivery of multicast data, and
the determining unit checks whether only the terminal unit requests the delivery of the multicast data, and determines that a connection needs to be established when only the terminal unit requests the delivery of the multicast data.

3. The multicast system according to claim 1, wherein
the first multicast-control message is a request from the terminal unit to stop the delivery of multicast data, and
the determining unit checks whether only the terminal unit among the terminal units receives the delivery of the multicast data, and determines that a connection needs to be removed when only the terminal unit receives the delivery of the multicast data.

4. The multicast system according to claim 1, wherein the second communication apparatus further includes
- a second multicast-control message generating unit that refers to the storage unit, and generates a second multicast-control message concerning transmission of multicast data according to whether a connection corresponding to the multicast data has been established; and
- a second multicast-control message transmitting unit that transmits the generated second multicast-control message to an upstream node.

5. The multicast system according to claim 4, wherein the second multicast-control message generating unit generates the second multicast-control message to request multicast data the first time a connection corresponding to the multicast data is established.

6. The multicast system according to claim 4, wherein the second multicast-control message generating unit generates the second multicast-control message to request to stop transmitting multicast data when all connections corresponding to the multicast data are removed.

7. The multicast system according to claim 4, wherein the second communication apparatus further includes a query receiving unit that receives from the upstream node a query to check whether transmission of multicast data is still required, wherein
the second multicast-control message generating unit refers to the storage unit, and generates the second multicast-control message according to the existence of a connection for transmitting the multicast data corresponding to the received query.

8. The multicast system according to claim 7, wherein the second multicast-control message generating unit generates the second multicast-control message to request the multicast data when the connection for transmitting the multicast data exists.

9. The multicast system according to claim 7, wherein the second multicast-control message generating unit generates the second multicast-control message to request to stop transmitting the multicast data when no connection for transmitting the multicast data exists.

10. The multicast system according to claim 1, wherein the first communication apparatus further includes
- a timer that counts a predetermined time from when the determining unit determines that a connection for multicast data needs to be established;
- a query transmitting unit that transmits a query to the terminal units after every elapse of the predetermined time to check whether the delivery of the multicast data is still required; and
- a controlling unit that causes the connection-control message transmitting unit to transmit the connection-control message to request connection removal when there is no response to the transmitted query.

11. The multicast system according to claim 1, wherein the first communication apparatus further includes
- a timer that counts a predetermined time from when the determining unit determines that a connection for multicast data is not required due to a first multicast-control message from any one of the terminal units;
- a reception determining unit that determines whether a first multicast-control message for the delivery of another multicast data is received from the terminal unit within the predetermined time; and
- a controlling unit that causes the connection-control message transmitting unit to transmit a connection-control message to request a connection changeover when a first multicast-control message for the delivery of another multicast data is received from the terminal unit.

12. A multicast method applied to a multicast system that includes a terminal unit, a first communication apparatus that sends a request for transmission of multicast data to a second communication apparatus and delivers multicast data to the terminal unit upon receiving the multicast data from the second communication apparatus, and the second communication apparatus that establishes a connection with the first communication apparatus upon receiving a request from the first communication apparatus and transmits requested multicast data to the first communication apparatus through the connection, the multicast method comprising:

the first communication apparatus
- receiving a multicast-control message from the terminal unit requesting delivery of multicast data;
- determining whether a connection needs to be established for multicast data specified by received multicast-control message based on the multicast-control message; and transmitting, according to the determination at the determining, a connection-control message to request connection establishment when a connection is required, and a connection-control message to request connection removal when a connection is not required, and the second communication apparatus receiving a connection-control message from the first communication apparatus;

controlling a connection to the first communication apparatus according to the received connection-control message; and storing a connection established at the controlling in association with corresponding multicast data.

\* \* \* \* \*